US010213922B2

(12) United States Patent
Motoyoshi (10) Patent No.: US 10,213,922 B2
(45) Date of Patent: Feb. 26, 2019

(54) ROBOT CONTROL APPARATUS AND ROBOT SYSTEM

(71) Applicant: Seiko Epson Corporation, Tokyo (JP)

(72) Inventor: Masaki Motoyoshi, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/880,200

(22) Filed: Jan. 25, 2018

(65) Prior Publication Data

US 2018/0147725 A1 May 31, 2018

Related U.S. Application Data

(63) Continuation of application No. 15/070,364, filed on Mar. 15, 2016, now Pat. No. 9,914,215.

(30) Foreign Application Priority Data

Mar. 26, 2015 (JP) ................. 2015-063922

(51) Int. Cl.
 *B25J 13/08* (2006.01)
 *B25J 9/16* (2006.01)

(52) U.S. Cl.
 CPC ... *B25J 9/1633* (2013.01); *G05B 2219/40558* (2013.01); *Y10S 901/09* (2013.01)

(58) Field of Classification Search
 CPC ...... B25J 9/1633; B25J 9/1692; B25J 9/1697; B25J 13/085; G05B 2219/40558; G05B 2219/39529; Y10S 901/09
 USPC ................ 700/258, 260–263, 245, 250, 251; 901/11, 14–16, 34, 41; 345/156, 157
 See application file for complete search history.

(56) References Cited

U.S. PATENT DOCUMENTS

| 6,522,952 | B1 * | 2/2003 | Arai ................. | B25J 9/1679 |
| | | | | 414/591 |
| 8,396,594 | B2 | 3/2013 | Okazaki | |
| 9,815,193 | B2 * | 11/2017 | Trujillo ............... | B25J 9/1612 |
| 2010/0087955 | A1 * | 4/2010 | Tsusaka .............. | B25J 9/0003 |
| | | | | 700/245 |
| 2011/0093120 | A1 | 4/2011 | Ando et al. | |
| 2011/0106311 | A1 | 5/2011 | Nakajima et al. | |

(Continued)

FOREIGN PATENT DOCUMENTS

| JP | 62-035915 A | 2/1987 |
| JP | 2001-277162 A | 10/2001 |

(Continued)

*Primary Examiner* — Dalena Tran
(74) *Attorney, Agent, or Firm* — Harness, Dickey & Pierce, P.L.C.

(57) ABSTRACT

In order to set control with a high degree of freedom while taking into account a time response waveform, a robot control apparatus includes a control section that acquires a driving position of a driving section that drives a robot and a detection value of an operation force operating on the robot detected by a force detector, and controls the driving section based on the detection value, a first setting value, and a second setting value; a first display section that displays a detection waveform that is a time response waveform of the detection value; a second display section that displays a storage waveform that is a time response waveform of the operation force stored in a storage medium in advance; and a receiving section that receives setting of at least the second setting value.

20 Claims, 4 Drawing Sheets

(56) References Cited

U.S. PATENT DOCUMENTS

2011/0301758 A1 12/2011 Nakajima et al.
2013/0310977 A1 11/2013 Tsusaka et al.
2014/0188281 A1 7/2014 Nagai et al.
2014/0277729 A1 9/2014 Nakamura et al.

FOREIGN PATENT DOCUMENTS

| JP | 2008-134903 A | 6/2008 |
| JP | 2011-088225 A | 5/2011 |
| JP | 2014-128857 A | 7/2014 |

\* cited by examiner

ROBOT CONTROL APPARATUS AND ROBOT SYSTEM

CROSS-REFERENCE TO RELATED APPLICATIONS

This application is a continuation of the U.S. patent application Ser. No. 15/070,364, filed on Mar. 15, 2016, which claims priority to Japanese Patent Application No. 2015-063922, filed on Mar. 26, 2015. The entire disclosures of both applications are expressly incorporated by reference herein.

BACKGROUND

1. Technical Field

The present invention relates to a robot control apparatus and a robot system.

2. Related Art

Conventionally, a robot teaching system automatically adjusting virtual inertia parameters, virtual viscosity parameters, and a spring coefficient of impedance control has been known (see JP-A-2014-128857). A coefficient in which a force waveform does not diverge, a coefficient in which response of a force feedback is improved, and a coefficient which can quickly follow with only slight delay are obtained in JP-A-2014-128857.

However, a result also might not necessarily be satisfiable, which is automatically adjusted so as to improve the force waveform depending on operation contents performed by the robot or hope of a user.

SUMMARY

An advantage of some aspects of the invention is to provide a technique in which a high degree of freedom of control can be set while taking into account a time response waveform.

A robot control apparatus according to an aspect of the invention includes a control section that acquires a driving position of a driving section that drives a robot and a detection value of an operation force operating on the robot detected by a detector, and controls the driving section based on the detection value, a first setting value, and a second setting value; a first display section that displays a detection waveform that is a time response waveform of the detection value; a second display section that displays a storage waveform that is a time response waveform of the operation force stored in a storage medium in advance; and a receiving section that receives setting of at least the second setting value.

In the above-described configuration, a user can easily determine whether or not the detection waveform actually detected by the force detector becomes a desired shape by comparing the detection waveform to the storage waveform stored in the storage medium in advance, and it is possible to perform setting of the second setting value so that the detection waveform becomes a desired shape. Since the second setting value can be set so that the detection waveform becomes the desired shape, setting of a high degree of freedom of control can be performed while taking into account the time response waveform.

Functions of respective units described in the appended claims can be implemented by hardware resources whose functions are specified by configuration itself, hardware resources whose functions are specified by programs, or a combination thereof. In addition, the functions of the respective units are not limited to those each of which is implemented by hardware resources that are physically independent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings in accordance with the following sequence. Moreover, the same reference numerals are given to the corresponding configuration elements in each view and redundant description will be omitted.

(1) First Embodiment
(2) Other Embodiments

(1) First Embodiment

Figure 1:
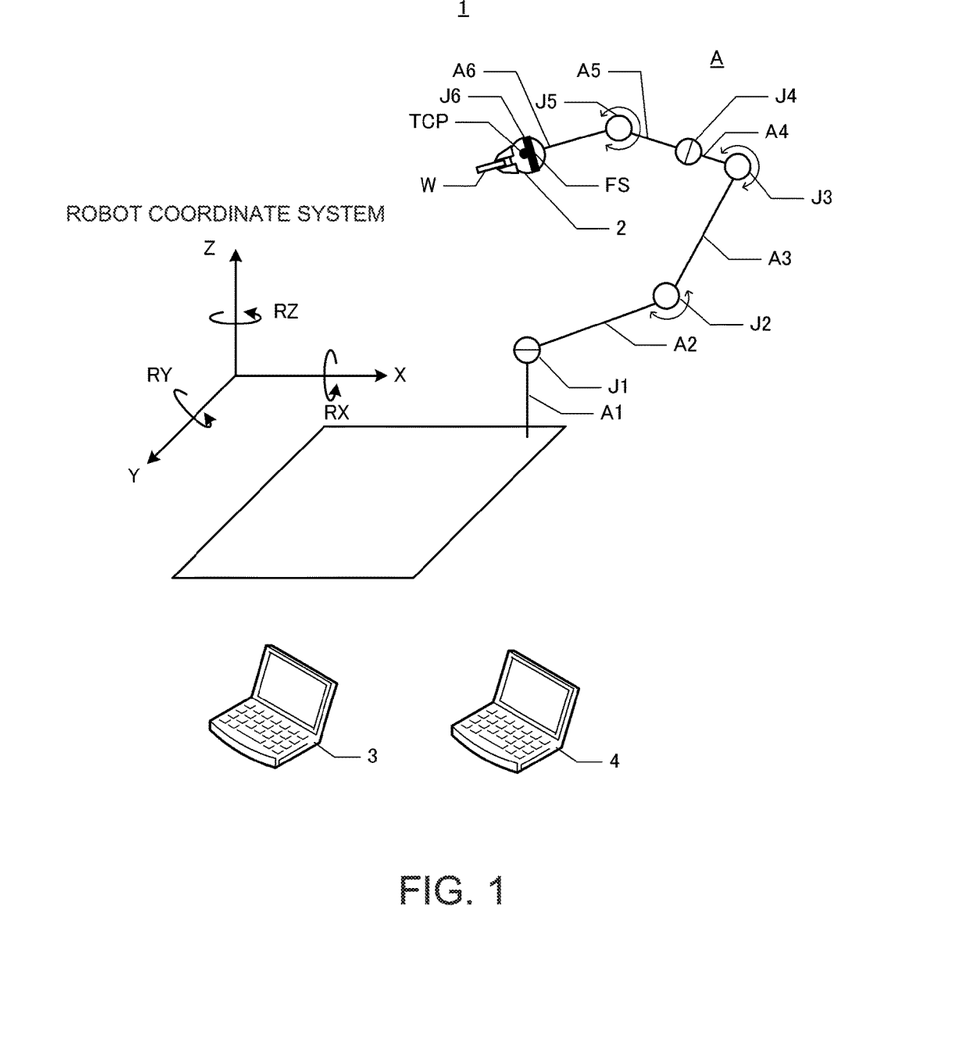
FIG. 1 is a schematic diagram of a robot system.

As illustrated in FIG. 1, a robot system as a first embodiment of the invention includes a robot 1, an end effector 2, a control terminal 3 (controller), and a teaching terminal 4 (teaching pendant). The control terminal 3 and the teaching terminal 4 configure a robot control apparatus according to the invention. The control terminal 3 configures a control section according to the invention. The control terminal 3 and the teaching terminal 4 may respectively be dedicated computers or may be general-purpose computers in which programs for the robot 1 are installed. Furthermore, the control terminal 3 and the teaching terminal 4 may not be separate computers and may be a single computer.

The robot 1 is a single-arm robot including one arm A and the arm A as a driving section includes six joints J1, J2, J3, J4, J5, and J6. Six arm members A1 to A6 are connected by the joints J1, J2, J3, J4, J5, and J6. The joints J2, J3, and J5 are bending joints and the joints J1, J4, and J6 are torsion joints. The end effector 2 for performing gripping, processing, and the like for a workpiece is mounted on the joint J6. A predetermined position of a front end on a rotational shaft of the joint J6 represents a tool center point (TCP). The position of the TCP is a reference of positions of various end effectors 2. In addition, a force sensor FS is included in the joint J6. The force sensor FS is a 6-axis force detector. The force sensor FS detects a size of a force on three detection axes orthogonal to each other and detects a size of torque around three detection axes.

In FIG. 1, the end effector 2 gripping a workpiece W is mounted on the front end of the joint J6. A coordinate system defining a space in which the robot 1 is installed represents a robot coordinate system. The robot coordinate system is a three-dimensional orthogonal coordinate system defined by an X-axis and a Y-axis orthogonal to each other on a horizontal plane, and a Z-axis of which a positive direction is vertical. In addition, a rotation angle around the X-axis is represented by RX, a rotation angle around the Y-axis is represented by RY, and a rotation angle around the Z-axis is represented by RZ. It is possible to represent an arbitrary position in a three-dimensional space by a position in X, Y, and Z directions and to represent an arbitrary posture (rotating direction) in the three-dimensional space by the rotation angles in RX, RY, and RZ directions. Hereinafter, the posture may also be included in the meaning when referring to the position. In addition, the torque operating in the RX, RY, and RZ directions may also be included in the meaning when referring to the force. The control terminal 3 controls the position of the TCP in the robot coordinate system by driving the arm A.

Figure 2:
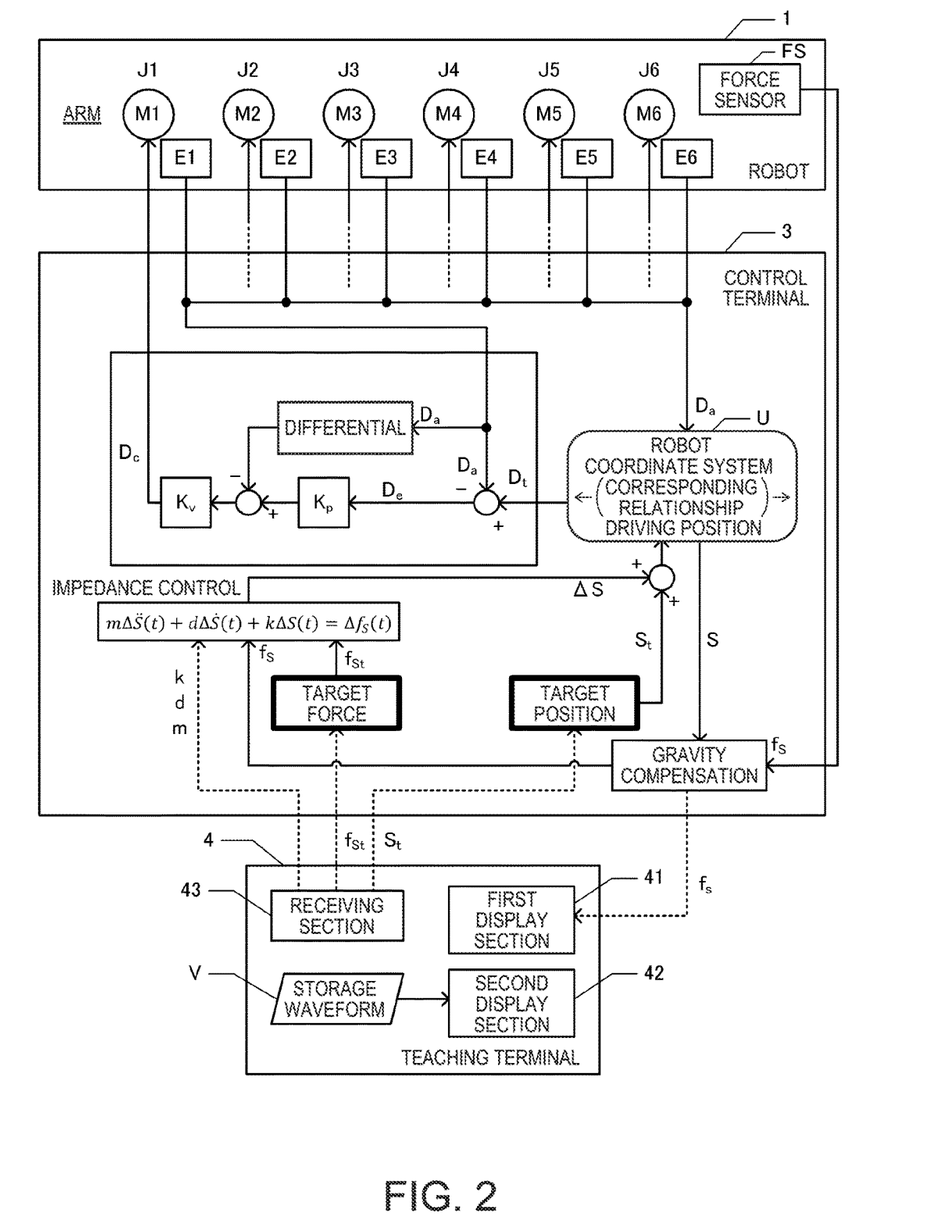
FIG. 2 is a block diagram of the robot system.

FIG. 2 is a block diagram of a robot system. A control program for performing control of the robot 1 is installed in the control terminal 3. The control terminal 3 includes a processor, a RAM, and a ROM, and these hardware resources cooperate with the control program. Thus, the control terminal 3 functions as the control section.

The control terminal 3 controls the arm A of which a target position and a target force set by a teaching operation of a user, for example, are realized by the TCP. The target force is a force to be detected by the force sensor FS. S represents any one direction among axis directions (X, Y, Z, RX, RY, and RZ) defining the robot coordinate system. For example, if S=X, an X-direction component of the target position set in the robot coordinate system is denoted as $S_t=X_t$ and the X-direction component of the target force is denoted as $f_{St}=f_{Xt}$. In addition, S also represents a position in an S-direction.

The robot 1 includes motors M1 to M6 as driving sections and encoders E1 to E6 in addition to the configuration illustrated in FIG. 1. The motors M1 to M6 and the encoders E1 to E6 are included respectively corresponding to the joints J1 to J6, and the encoders E1 to E6 detect the driving positions of the motors M1 to M6. Controlling the arm A means controlling the motors M1 to M6. The control terminal 3 is able to communicate with the robot 1. The control terminal 3 stores a corresponding relationship U between a combination of the driving positions of the motors M1 to M6 and the position of the TCP in the robot coordinate system. In addition, the control terminal 3 stores the target position $S_t$ and the target force $f_{St}$ for each operation process performed by the robot 1. The target position $S_t$ and the target force $f_{St}$ are set by teaching operation described below.

The control terminal 3 converts the driving positions $D_a$ into positions S (X, Y, Z, RX, RY, and RZ) in the robot coordinate system based on the corresponding relationship U when acquiring the driving positions $D_a$ of the motors M1 to M6. The control terminal 3 specifies an operation force $f_s$ operating on the force sensor FS in reality in the robot coordinate system based on the position S of the TCP and a detection value of the force sensor FS. Moreover, the force sensor FS detects a detection value in its own coordinate system and, since a relative position and direction between the force sensor FS and the TCP are stored as known data, the control terminal 3 can specify the operation force $f_s$ in the robot coordinate system. The control terminal 3 performs gravity compensation with respect to the operation force $f_s$. The gravity compensation is performed to remove the gravity component from the operation force $f_s$. In addition, the operation force $f_s$ in which the gravity component is performed can be regarded as a force other than gravity acting on the workpiece.

The control terminal 3 specifies a resultant force correction amount ΔS that is obtained by substituting the target force $f_{St}$ and the operation force $f_s$ in a motion equation of the impedance control. Expression (1) is the motion equation of the impedance control.

$$m\Delta\ddot{S}(t)+d\Delta\dot{S}(t)+k\Delta S(t)=\Delta f_S(t) \quad (1)$$

The left side of Expression (1) is configured of a first term that is obtained by multiplying a virtual inertia parameter m by a second order differential value of the position S of the TCP, a second term that is obtained by multiplying a virtual viscosity parameter d by a differential value of the position S of the TCP, and a third term that is obtained by multiplying a virtual elastic parameter k by the position S of the TCP. A right side of Expression (1) is configured of a force deviation $\Delta f_S(t)$ that is obtained by subtracting a force f in reality from the target force $f_{St}$. The differential in Expression (1) means a differential in terms of time. In steps that are performed by the robot 1, a constant value is set as the target force $f_{St}$ or a value that is derived by a function depending on time as the target force $f_{St}$ may also be set.

The impedance control is control that realizes a virtual mechanical impedance by the motors M1 to M6. The virtual inertia parameter m means a mass that is virtually included in the TCP, the virtual viscosity parameter d means a viscosity resistance that is virtually received by the TCP, and the virtual elastic parameter k means a spring constant of an elastic force that is virtually received by the TCP. Each of parameters m, d, and k may be set to be a different value for each direction or may be set to be a common value regardless of the direction. The resultant force correction amount ΔS means a size of the position S to which the TCP is to be moved to fix a force deviation $\Delta f_S(t)$ with the target force $f_{St}$ if the TCP receives the mechanical impedance. The control terminal 3 specifies a correction target position $(S_t+\Delta S)$ taking into account the impedance control by adding the resultant force correction amount ΔS to the target force $f_{St}$.

Then, the control terminal 3 converts the correction target position $(S_t+\Delta S)$ in a direction of each axis defining the robot coordinate system into a target driving position $D_t$ that is a driving position of the target of each of the motors M1 to M6 based on the corresponding relationship U. The control terminal 3 calculates a driving position deviation $D_e$ $(=D_t-D_a)$ that is obtained by subtracting the driving position $D_a$ in reality of the motors M1 to M6 from the target driving position $D_t$. Then, the control terminal 3 specifies a control amount $D_c$ obtained by adding a value that is obtained by multiplying a position control gain $K_p$ to the driving position deviation $D_e$ and a value that is obtained by multiplying a velocity control gain $K_v$ to a driving velocity deviation that is a difference with a driving velocity that is a time differential value of the driving position $D_a$ in reality. Moreover, the position control gain $K_p$ and the velocity control gain $K_v$ may include not only a proportional component but also a control gain according to a differential component and an integral component. The control amount $D_c$ is specified for each of the motors M1 to M6. The control terminal 3 can control the arm A by the above-described configuration based on the target position $S_t$ and the target force $f_{St}$.

A teaching program for teaching the target position $S_t$ and the target force $f_{St}$ to the control terminal 3 is installed in the teaching terminal 4. The teaching terminal 4 includes a processor, a RAM, and a ROM, and these hardware resources cooperate with the control program. Thus, as illustrated in FIG. 2, the teaching terminal 4 includes a first display section 41, a second display section 42, and a receiving section 43 as functional configurations. Although not illustrated, the teaching terminal 4 includes input devices (mouse, keyboard, touch panel, and the like) receiving instructions from the user and output device (display, speaker, and the like) outputting various pieces of information to the user. Hereinafter, a detailed process that is performed by the first display section 41, the second display section 42, and the receiving section 43 will be described with reference to a flowchart.

Figure 3:
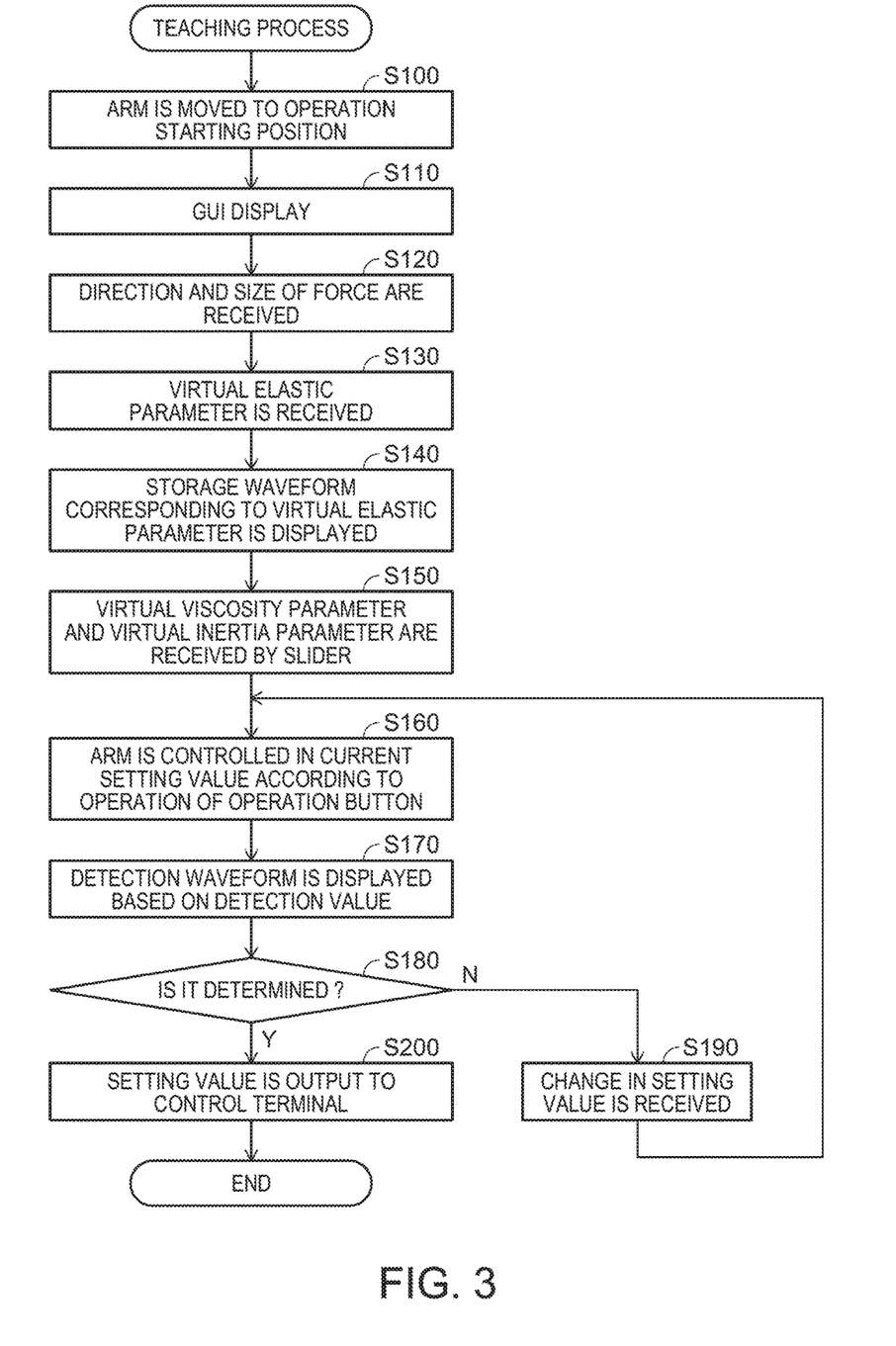
FIG. 3 is a flowchart of a teaching process.

FIG. 3 is a flowchart of the teaching process. Moreover, the teaching process of FIG. 3 is a process for teaching parameters of the impedance control together with the target force $f_{St}$ and a process for teaching the target position $S_t$ is separately performed. The target position $S_t$ can be taught by a known teaching method and, for example, the target position $S_t$ may be taught by moving the arm A by using the hand of the user or the target position $S_t$ may be taught by designating a coordinate in the robot coordinate system by the teaching terminal 4.

First, the receiving section 43 moves the arm A to an operation starting position (step S100). That is, the receiving section 43 executes control of the arm A so that the TCP becomes the operation starting position with respect to the control terminal 3. The operation starting position is a position of the TCP immediately before controlling the arm A so that an operation force is operated with respect to the force sensor FS. For example, the operation starting position is a position immediately before pressing the workpiece W gripped, for example, by the end effector 2 against another object, a position immediately before processing another object by the end effector 2 gripping a processing tool, and the like. However, in the teaching process of FIG. 3, the target force $f_{St}$ and parameters of the impedance control may be set and the operation starting position may not be a position immediately before controlling the arm A so that the operation force is operated with respect to the force sensor FS in actual operation. Next, the receiving section 43 displays a graphical user interface (GUI) (step S110).

Figure 4:
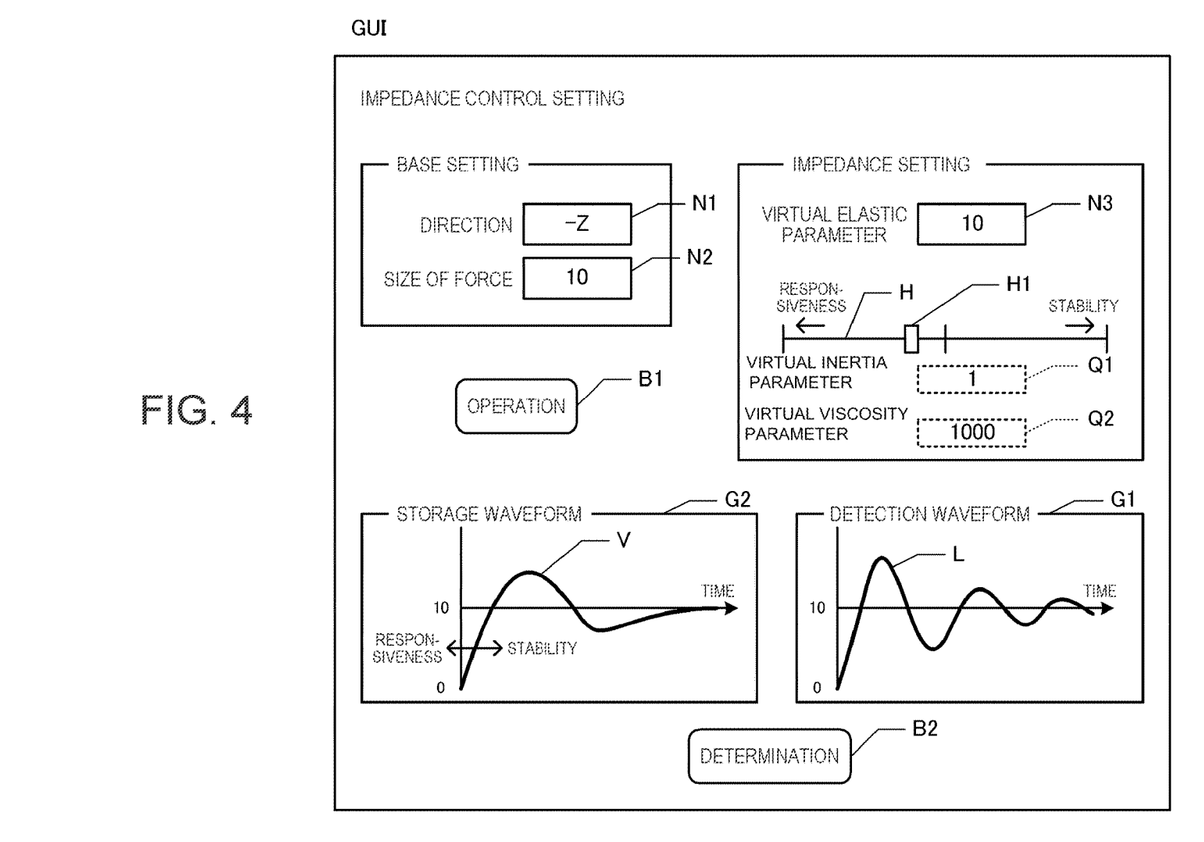
FIG. 4 is a diagram illustrating a GUI.

FIG. 4 is a diagram illustrating the GUI. As illustrated in FIG. 4, the GUI includes input windows N1 to N3, a slider bar H, display windows Q1 and Q2, graph G1 and G2, and buttons B1 and B2. The receiving section 43 receives an operation performed in the GUI by the input device.

If the GUI is displayed, the receiving section 43 receives a direction of the force (direction of the target force $f_{St}$) and a size of the force (size of the target force $f_{St}$) (step S120). In the GUI, the input window N1 for receiving the direction of the force and the input window N2 for receiving the size of the force are provided. The receiving section 43 receives an input of any one axis defining the robot coordinate system in the input window N1. In addition, the receiving section 43 receives an input of an arbitrary numerical value in the input window N2.

Next, the receiving section 43 receives the virtual elastic parameter k (step S130). In the GUI, the input window N3 for receiving the virtual elastic parameter k is provided. The receiving section 43 receives an input of an arbitrary numerical value in the input window N3. The virtual elastic parameter k corresponds to the first setting value. The user may set the virtual elastic parameter k to be a small value if the user wants the workpiece W or the end effector 2 to come into soft contact with another object. In contrast, the user may set the virtual elastic parameter k to be a large value if the user wants the workpiece W or the end effector 2 to come into hard contact with another object.

When receiving the virtual elastic parameter k, the second display section 42 displays a storage waveform V corresponding to the virtual elastic parameter k in the graph G2 (step S140). A horizontal axis of the graph G2 indicates time and a vertical axis of the graph G2 indicates the operation force. The storage waveform V is a time response waveform of the operation force and is stored in the storage medium of the teaching terminal 4 in advance for each virtual elastic parameter k. The storage waveform V is a waveform that is converged to the force of the size received by the input window N. The storage waveform V is the time response waveform of the operation force that is detected by the force sensor FS when controlling the arm A such that the force of the size received by the input window N2 is detected by the force sensor FS in general conditions. Since a shape (inclination) of the storage waveforms V is different if the virtual elastic parameter k is significantly different, the storage waveform V is stored for each virtual elastic parameter k.

The storage waveform V may be a waveform that is a guide of the user, may be a waveform recommended, for example, by a manufacturer of the robot 1, or may be a waveform that is achievements obtained by the operation normally performed by the robot 1 in the past. In addition, the storage waveform V may be prepared for each type of operation such as a fitting operation and a polishing operation, or may be prepared for each mechanical characteristic (elastic modulus, hardness, and the like) of the workpiece W or mechanical characteristic of an object coming into contact with the workpiece W or the end effector 2.

Next, the receiving section 43 receives the virtual viscosity parameter d and the virtual inertia parameter m depending on the operation of a slider H1 in the slider bar H (step S150). In the GUI of FIG. 4, the slider bar H and the slider H1 that is slidable on the slider bar H are provided as a configuration for receiving the virtual inertia parameter m and the virtual viscosity parameter d. The receiving section 43 receives an operation that slides the slider H1 on the slider bar H. Moreover, the slider bar H displays setting that stability is emphasized as the slider H1 moves in a right direction and setting that responsiveness is emphasized as the slider H1 moves in a left direction.

Then, the receiving section 43 acquires a slide position of the slider H1 on the slider bar H and receives the virtual inertia parameter m and the virtual viscosity parameter d corresponding to the slide position. Specifically, the receiving section 43 receives setting of the virtual inertia parameter m and the virtual viscosity parameter d so that a ratio of the virtual inertia parameter m to the virtual viscosity parameter d becomes constant (for example, m:d=1:1000). In addition, the receiving section 43 displays the virtual inertia parameter m and the virtual viscosity parameter d corresponding to the slide position of the slider H1 in the display windows Q1 and Q2.

Moreover, the virtual inertia parameter m and the virtual viscosity parameter d are increased as the slider H1 is moved in the right direction in the slider bar H of FIG. 4. If the virtual inertia parameter m and the virtual viscosity parameter d are increased, since the position of the TCP is unlikely to move, the operation force detected by the force sensor FS is likely to be stable. If the virtual inertia parameter m and the virtual viscosity parameter d are decreased, since the position of the TCP is likely to move, the responsiveness of the operation force detected by the force sensor FS becomes better. Moreover, the slider H1 corresponds to the single operation section capable of receiving setting of the virtual inertia parameter m and the virtual viscosity parameter d. In addition, the virtual inertia parameter m and the virtual viscosity parameter d correspond to the second setting value.

Next, the receiving section 43 controls the arm A in a current setting value in response to the operation of the operation button B1 (step S160). That is, the receiving section 43 outputs the target force $f_{St}$ set in the GUI and the parameters m, d, and k of the impedance control to the control terminal 3 and commands the arm A to control the arm A based on these setting values. A case of the GUI of FIG. 4, the arm A is configured such that the workpiece W moves in a −Z direction, the workpiece W comes into contact with another object in the −Z direction and then the operation force $f_s$ of the size set by the GUI is detected by the force sensor FS.

Next, the second display section 42 displays a detection waveform L in the graph G1 based on the detection value (step S170). The storage waveform V is the time response waveform of the operation force $f_s$ as the detection value detected by the force sensor FS. The second display section 42 acquires the operation force $f_s$ after the gravity component from the control terminal 3 and stores the operation force $f_s$ in the storage medium of the teaching terminal 4 for each predetermined sampling cycle in a period in which the arm A is controlled in step S160. Then, if step S160 is completed, the operation force $f_s$ is acquired from the storage medium and the detection waveform L that is a waveform of a time system of the operation force $f_s$ is displayed in the graph G1 for each sampling cycle. The vertical axis and horizontal axis of the graph G1 use the same scale as the vertical axis and horizontal axis of the graph G2. Of course, the detection waveform L is also the waveform that converges to the force of the size received by the input window N.

Next, the receiving section 43 determines whether or not the determination button B2 is operated (step S180). That is, the receiving section 43 determines whether or not an operation for conclusively determining each setting value set by the GUI is received.

If it is determined that the determination button B2 is not operated (step S180: N), the receiving section 43 receives a change in the setting value by the GUI (step S190) and the process returns to step S160. That is, as the user is not satisfied with the detection waveform L, the setting operation of the parameters m, d, and k of the impedance control is continuously received by the GUI. If the determination button B2 is operated after receiving the change in the setting value, the arm A is controlled by the setting value after the change and the detection waveform L is updated and displayed in the graph G1. Moreover, in step S190, if the virtual elastic parameter k is changed, the storage waveform V may be updated and displayed in the graph G2.

On the other hand, if it is determined that the determination button B2 is operated (step S180: Y), the receiving section 43 outputs the setting value to the control terminal 3 (step S200) and the teaching process is completed. Thus, it is possible to teach the parameters m, d, and k of the impedance control to the control terminal 3 together with the target force $f_{St}$ set by the GUI.

In the above-described configuration, the user can easily determine whether or not the detection waveform L that is detected by the force sensor FS in reality becomes a desired shape compared to the storage waveform V stored in the storage medium in advance, and can perform setting of the virtual inertia parameter m and the virtual viscosity parameter d so that the detection waveform L becomes the desired shape. Since the virtual inertia parameter m and the virtual viscosity parameter d can be set so that the detection waveform L becomes the desired shape, setting of control with a high degree of freedom can be performed while taking into account the time response waveform. The user may not set the virtual inertia parameter m and the virtual viscosity parameter d of shapes similar to the storage waveform V, which are obtained by the detection waveform L, or the user can intentionally set the virtual inertia parameter m and the virtual viscosity parameter d in which the detection waveform L becomes converged slower or faster than the storage waveform V is obtained. In addition, the user can intentionally set the virtual inertia parameter m and the virtual viscosity parameter d in which the detection waveform L of which an amplitude is greater than or less than the storage waveform V is obtained.

In addition, in order to display the storage waveform V corresponding to the virtual elastic parameter k largely influencing on the time response waveform, it is possible to display the storage waveform V that is a reference in comparison to the detection waveform L. In addition, since the virtual inertia parameter m and the virtual viscosity parameter d can be set by the operation of the single slider H1, it is possible to easily set the virtual inertia parameter m and the virtual viscosity parameter d. Since the direction in which the stability is emphasized, and the direction in which the responsiveness is emphasized are displayed by the slider bar H, it is possible to intuitively set the virtual inertia parameter m and the virtual viscosity parameter d. Particularly, since the virtual inertia parameter m and the virtual viscosity parameter d are maintained at the constant ratio, it is possible to easily realize setting in which the stability is emphasized and setting in which the responsiveness is emphasized.

(2) Other Embodiments

The robot 1 is not necessarily the six-axis single-arm robot, and may be a robot in which a force is operated in any location depending on the driving of the robot. For example, the robot 1 may be a double-arm robot or may be a scalar robot. In addition, the force detector may not be the force sensor FS and may be a torque sensor detecting a torque operating on the joints J1 to J6 for each of the joints J1 to J6. In addition, the torque may be detected based on loads of the motors M1 to M6 instead of the torque sensor. In this case, the parameters of the impedance control may be taught together with a target torque in the joints J1 to J6.

In addition, the control terminal 3 may perform control based on the detection value of the force detector, the first setting value, and the second setting value, or may also perform a force control other than the impedance control. In addition, the control terminal 3 may not necessarily perform the impedance control taking into account all three parameters m, d, and k, and may also perform the impedance control taking into account only one or two among them.

In addition, the receiving section 43 may not necessarily set the virtual inertia parameter m and the virtual viscosity parameter d so that the ratio of the virtual inertia parameter m and the virtual viscosity parameter d becomes constant, or the ratio of the virtual inertia parameter m and the virtual viscosity parameter d may be changed depending on the position of the slider H1 or an operation situation of another operation section. Furthermore, the receiving section 43 may not necessarily receive the virtual inertia parameter m and the virtual viscosity parameter d in the single operation section (slider H1), or the virtual inertia parameter m, the virtual viscosity parameter d, and each GUI that is capable of direct input may be supplied to skilled users.

In addition, in the configuration in which the storage waveform V corresponding to the first setting value is displayed, the first setting value may not necessarily be the virtual elastic parameter k, or may be at least one of the virtual inertia parameter m and the virtual viscosity parameter d. Furthermore, the receiving section 43 may not necessarily receive both the first setting value and the second setting value, or may receive at least the second setting value. For example, the receiving section 43 may display the storage waveform V corresponding to the virtual elastic parameter k that is determined in advance without receiving the virtual elastic parameter k as the first setting value.

What is claimed is:

1. A robot control apparatus comprising:
a controller that is configured to control a motor for driving a robot based on:
an operation force operating on the robot detected by a force detector;
a virtual elastic parameter;
a virtual inertia parameter; and
a virtual viscosity parameter;
an information display that has an indicator for adjusting a ratio of the virtual inertia parameter and the virtual viscosity parameter; and
a receiving section that receives the ratio of the virtual inertia parameter and the virtual viscosity parameter based on a state of the indicator of the information display, the receiving section transferring the ratio to the controller.

2. The robot control apparatus according to claim 1, wherein the indicator of the information display is a slider-bar in which a slider is movable within the slider-bar, and a position of the slider corresponds to the ratio of the virtual inertia parameter and the virtual viscosity parameter.

3. The robot control apparatus according to claim 2, wherein the information display has an input window for accepting a value of the virtual elastic parameter by a user.

4. The robot control apparatus according to claim 3, wherein the information display has a first parameter display, and the first parameter display displays a first value corresponding to the virtual inertia parameter based on the position of the slider in the slider-bar, and
the slider-bar is located between the input window and the first parameter display on the information display.

5. The robot control apparatus according to claim 3, wherein the information display has a first parameter display, and the first parameter display displays a first value corresponding to the virtual inertia parameter based on the position of the slider in the slider-bar,
wherein the information display has a second parameter display, and the second parameter display displays a second value corresponding to the virtual viscosity parameter based on the position of the slider in the slider-bar,
the slider-bar is located between the input window and the first parameter display on the information display, and
the first parameter display is located between the slider-bar and the second parameter display on the information display.

6. The robot control apparatus according to claim 2, wherein the information display has a first parameter display, and the first parameter display displays a first value corresponding to the virtual inertia parameter based on the position of the slider in the slider-bar.

7. The robot control apparatus according to claim 2, wherein the information display has a first parameter display, and the first parameter display displays a first value corresponding to the virtual inertia parameter based on the position of the slider in the slider-bar, and
wherein the information display has a second parameter display, and the second parameter display displays a second value corresponding to the virtual viscosity parameter based on the position of the slider in the slider-bar.

8. The robot control apparatus according to claim 1, wherein the information display has an input window for accepting a value of the virtual elastic parameter by a user.

9. The robot control apparatus according to claim 8, wherein the information display has a first parameter display, and the first parameter display displays a first value corresponding to the virtual inertia parameter of the ratio, and
the indicator is located between the input window and the first parameter display on the information display.

10. The robot control apparatus according to claim 8, wherein the information display has a first parameter display, and the first parameter display displays a first value corresponding to the virtual inertia parameter of the ratio,
wherein the information display has a second parameter display, and the second parameter display displays a second value corresponding to the virtual viscosity parameter of the ratio, the indicator is located between the input window and the first parameter display on the information display, and
the first parameter display is located between the indicator and the second parameter display on the information display.

11. The robot control apparatus according to claim 1, wherein the information display has a first parameter display, and the first parameter display displays a first value corresponding to the virtual inertia parameter of the ratio.

12. The robot control apparatus according to claim 1, wherein the information display has a first parameter display, and the first parameter display displays a first value corresponding to the virtual inertia parameter of the ratio, and
wherein the information display has a second parameter display, and the second parameter display displays a second value corresponding to the virtual viscosity parameter of the ratio.

13. The robot control apparatus according to claim 1, wherein the ratio of the virtual inertia parameter and the virtual viscosity parameter is constant.

14. A robot system comprising:
a motor that drives a robot;
a force detector that detects an operation force operating on the robot;
a controller that is configured to control the motor for driving the robot based on:
the operation force detected by the force detector;
a virtual elastic parameter;
a virtual inertia parameter; and
a virtual viscosity parameter;
an information display that has an indicator for adjusting a ratio of the virtual inertia parameter and the virtual viscosity parameter; and
a receiving section that receives the ratio of the virtual inertia parameter and the virtual viscosity parameter based on a state of the indicator of the information display, the receiving section transferring the ratio to the controller.

15. The robot system according to claim 14, wherein the indicator of the information display is a slider-bar in which a slider is movable within the slider-bar, and a position of the slider corresponds to the ratio of the virtual inertia parameter and the virtual viscosity parameter.

16. The robot system according to claim 15, wherein the information display has an input window for accepting a value of the virtual elastic parameter by a user.

17. The robot system according to claim 15, wherein the information display has a first parameter display, and the first parameter display displays a first value corresponding to the virtual inertia parameter based on the position of the slider in the slider-bar.

18. The robot system according to claim 14, wherein the information display has an input window for accepting a value of the virtual elastic parameter by a user.

19. The robot system according to claim 18, wherein the information display has a first parameter display, and the first parameter display displays a first value corresponding to the virtual inertia parameter of the ratio, and the indicator is located between the input window and the first parameter display on the information display.

20. The robot system according to claim 14, wherein the information display has a first parameter display, and the first parameter display displays a first value corresponding to the virtual inertia parameter of the ratio.

* * * * *